(No Model.)
D. CLOW.
TRANSPLANTER.
No. 495,304. Patented Apr. 11, 1893.
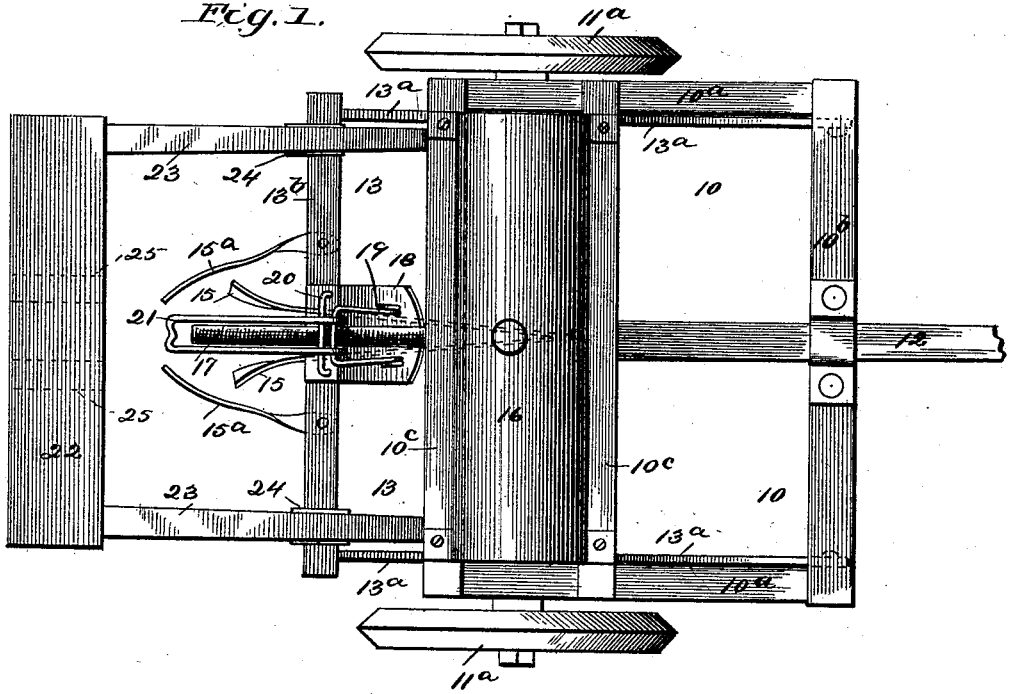
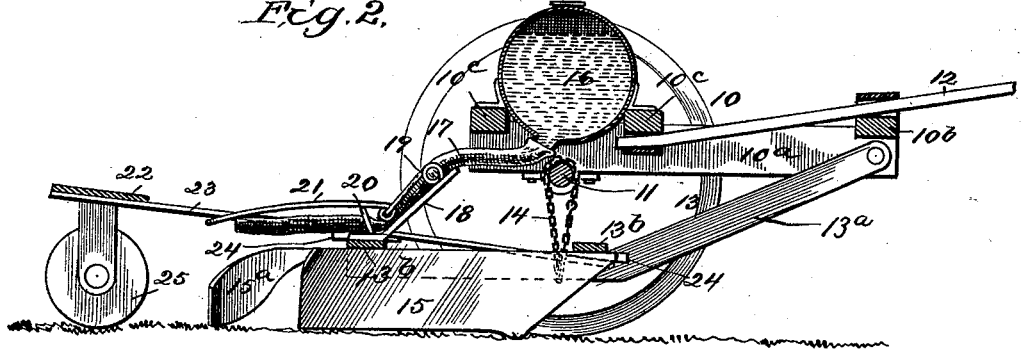
WITNESSES:
Fred J. Dieterich
Jos. A. Ryan
INVENTOR:
Daniel Clow.
BY 
ATTORNEYS
THE NORRIS PETERS CO., PHOTO-LITHO., WASHINGTON, D. C.

UNITED STATES PATENT OFFICE.

DANIEL CLOW, OF JANESVILLE, WISCONSIN.

TRANSPLANTER.

SPECIFICATION forming part of Letters Patent No. 495,304, dated April 11, 1893.

Application filed October 17, 1891. Serial No. 409,084. (No model.)

*To all whom it may concern:*

Be it known that I, DANIEL CLOW, of Janesville, in the county of Rock and State of Wisconsin, have invented a new and useful Improvement in Transplanters, of which the following is a specification.

This invention relates generally to transplanters and more particularly to an improved tobacco transplanting device.

The object of my invention is to provide an apparatus of this character which is adapted to carry a supply of water, and means for intermittently discharging a definite quantity of water upon each plant as it is placed in the ground; and my invention consists in certain parts and combination of parts as will be more fully described hereinafter.

In the drawings forming a part of this specification—Figure 1 is a top plan view of my improved transplanter, and Fig. 2 is a vertical longitudinal section.

In carrying out my invention I employ a main frame 10 composed of the side beams $10^a$ the front cross beam $10^b$ and the rear cross beams $10^c$. An axle 11 is connected with the main frame near the rear end of the same, and upon the ends of said axle are mounted the supporting wheels $11^a$ having double beveled rims or tires. A draft tongue or pole 12 is connected with the main frame at the forward end of the same by means of which the machine is moved.

A vertically adjustable supplemental frame 13 is arranged beneath the main frame, said supplemental frame consisting of the side bars $13^a$ and the cross bars $13^b$ the said cross bars connecting the side bars near their rear ends, said side bars being pivoted at their forward ends to the side beams of the main frame. The rear end of the supplemental frame is suspended from the main frame by means of chains 14 passing over the axle 11 and around each side bar of the supplemental frame.

A furrow opening plow 15 is secured to the under sides of the cross bars, for the purpose of producing a furrow in which the plants are set by hand, and by means of the chains 14 the supplemental frame can be adjusted vertically to produce a deep or shallow furrow. Coverer plows $15^a$ are also attached to the frame on each side of the furrow-plow.

A water supply tank 16 is arranged upon the rear end of main frame between the two rear cross beams thereof, and connected with said tank is a flexible discharge tube or pipe 17, the rear end of said tube or pipe projecting rearwardly and horizontally beyond the furrow opener and a short distance above the same whereby an approximately horizontal stream can be projected rearward which will strike upon the plant as it is placed in the furrow and the machine moved forward.

It is desirous to discharge the water only as the plant is placed in the furrow, thereby economizing in water, and in order to accomplish this I provide a regulating check valve intermediate the ends of the discharge tube or pipe and within easy reach of the feeder, whereby as each plant is placed with one hand the valve can be operated by the same hand watering each plant as it is placed.

While numerous valves may be employed in connection with my apparatus I have devised a novel form which partakes of the nature of a tube compressor, and consists of an inclined plate 18 attached at its lower end to the rear cross bar of supplemental frame, and a compressing bow spring 19 attached at its upper end to the upper end of plate, the flexible discharge tube or pipe 17 resting upon the inclined plate and beneath the compressing spring. A loop 20 is arranged upon the plate 18 near the lower end thereof, and fulcrumed upon said loop is a lever 21, the forward end being connected with the free end of the compressing spring. The loop also serves as a guide for the discharge tube or pipe.

A feeder's seat or frame is arranged at the rear of the supplemental frame, said feeder's seat or frame consisting of a seat or cross piece 22 and the tongues or side pieces 23, said tongues being inserted between the rear cross bars of the supplemental frame, under the forward bar and over the rear bar; and in order to adjust said seat I provide wedges 24 which are placed between the said tongues and cross bars as shown.

Covering rollers 25 are attached to the under side of the feeder seat to press the dirt around the plants and it is to regulate the pressure of these rollers that the feeder's seat is adjusted.

From the above it will be seen that I provide a vertically adjustable frame which can be adjusted to regulate the depth of furrow, a regulating valve which can be operated as desired to discharge the water upon the plant and an adjustable seat carrying rollers which press the dirt around the said plant.

In operation, the machine is moved forward, producing the desired depth of furrow. The feeder upon his seat then sets the plant in said furrow and at the same time operates the valve projecting a stream directly upon the plant as the machine moves forward, and when a sufficient quantity of water has been discharged the lever is released cutting off the water and as the machine continues forward, the coverer plows throw the dirt inward and the covering rollers press the said dirt firmly up around the plant and maintain it in its proper position.

Having thus described my invention, what I claim as new is—

1. In a transplanter the combination with a main frame carrying a water tank, of a supplemental frame suspended beneath the main frame, and carrying a furrow opener, a discharge pipe leading from the water tank and projecting rearwardly beyond the furrow opener, and a spring actuated compressor attached to the supplemental frame and adapted to bear upon the discharge pipe, the handle or lever of said compressor projecting rearwardly beyond the rear end of discharge pipe, whereby the compressor may be operated and a plant set and watered at one and the same time and with one hand of the operator.

2. In a transplanter, the combination with a main frame and water tank, of the supplemental frame and furrow opener, the seat frame, the inclined plate attached to supplemental frame, the discharge pipe resting thereon, the spring compressor, attached to the inclined plate and bearing on the discharge pipe, and the lever for elevating said spring compressor, said lever projecting rearwardly beyond the rear end of the discharge pipe substantially as shown and described.

DANIEL CLOW.

Witnesses:
HARRIETTE D. STAFFORD,
STELLA A. STAFFORD.